Jan. 4, 1966  G. VALENTINE  3,227,374
CAKE AND PASTRY HUMIDIFIER
Filed Feb. 10, 1964  2 Sheets-Sheet 1
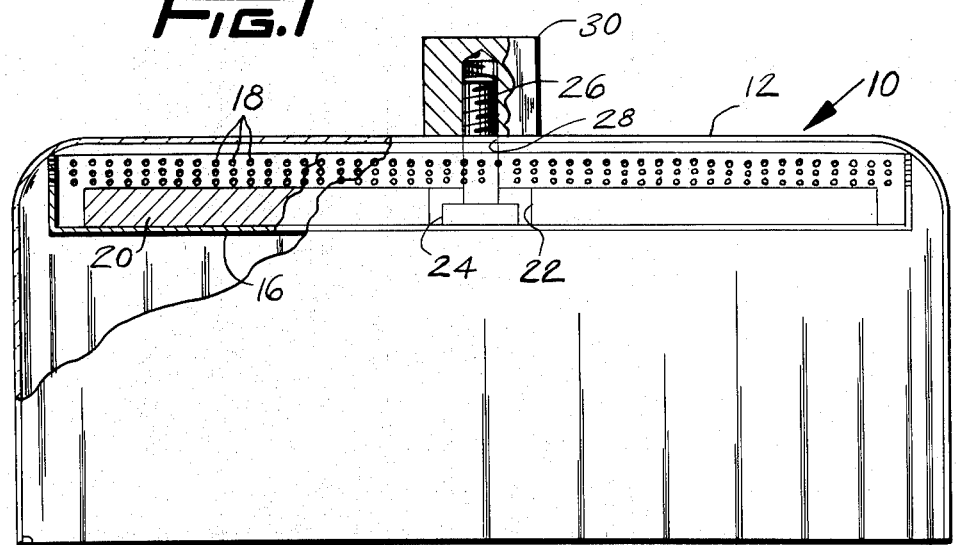
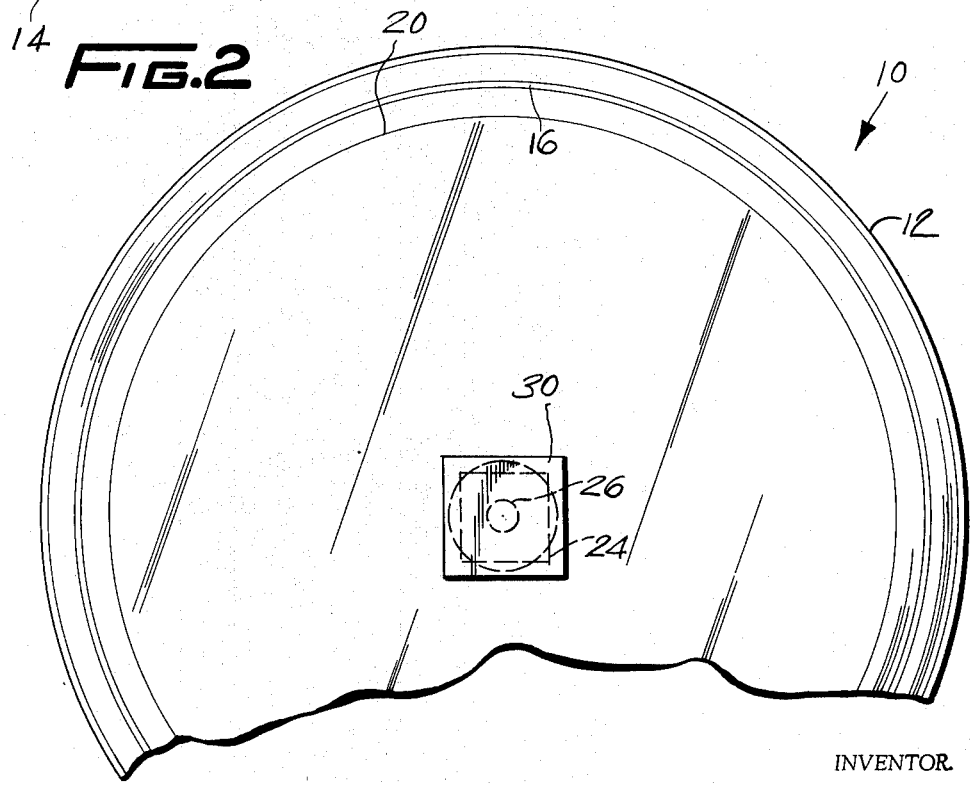
INVENTOR.

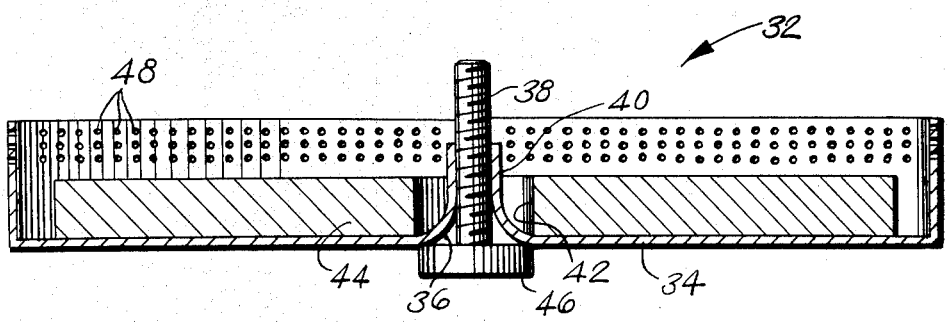
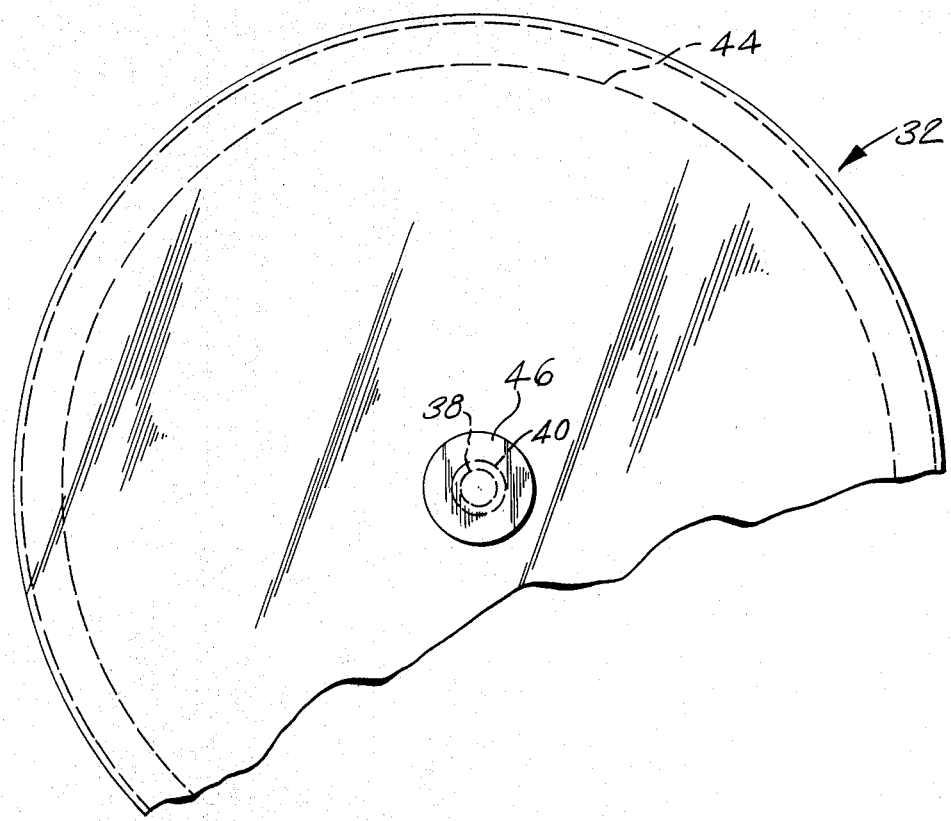

United States Patent Office 3,227,374
Patented Jan. 4, 1966

3,227,374
CAKE AND PASTRY HUMIDIFIER
George Valentine, 341 Center New Texas Road,
Pittsburgh, Pa.
Filed Feb. 10, 1964, Ser. No. 343,881
2 Claims. (Cl. 239—56)

This invention relates to humidifiers and more particularly to a humidifier for cakes and pastry.

It is a primary object of the present invention to provide a cake and pastry humidifier which will be used to keep cut and uncut cakes, pastry and bread moist and as fresh as possible by means of the evaporation of water or a water compounded solution through vented openings in the humidifier container.

Another object of the present invention is to provide a cake and pastry humidifier which will have upper container means for receiving a flat circular sponge or other fibrous evaporation baffle plates.

A further object of the present invention is to provide a cake and pastry humidifier which will have removable handle means for lifting the cover over the pastry and the handle means will also provide access to the interior enclosure containing the wet sponge.

Other objects of the invention are to provide a cake and pastry humidifier bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a side view of the present invention shown in elevation and partly broken away;

FIGURE 2 is a fragmentary top plan view of FIGURE 1;

FIGURE 3 is a sectional view showing a modified form of sponge container; and

FIGURE 4 is a fragmentary bottom plan view of FIGURE 3.

Referring now more in detail to the drawing, a cake and pastry humidifier 10 made in accordance with the present invention is shown to include a hollow, transparent cover 12 having a bottom opening 14 for the cake or pastry. A circular container 16 is received within cover 12 and is provided with a plurality of spaced apart openings 18 which allow water vapor to escape from the sponge 20 received within the container 16. A central opening 22 through sponge provides a means for receiving head 24 of a threaded bolt 26. Head 24 is fixedly secured to the bottom of container 16, and the threaded end of bolt 26 is freely received through the central opening 28 of cover 12 and a square knob 30 is threadedly received on the threaded end of bolt 26 to secure container 16 and its associated sponge 20 within the upper section of cover 12. In use, knob 30 is unthreaded from bolt 26 and container 16 is removed from opening 14 of cover 12. After removing container 16, water or other suitable fluid is placed into container 16 whereupon it saturates sponge 20. After sponge 20 is saturated with water container 16 is re-entered into opening 14 of cover 12, and the bolt 26 placed through opening 28, and knob 30 threadingly received on bolt 26 to draw container 16 upward until its rim abuts with and encroaches upon the inner radius of cover 12. When the water evaporates from sponge 20, it passes through openings 18 as water vapor and moisturizes the cake or pastry received beneath the cover 12.

It shall be noted that the dimensions of all component parts may vary and a short bolt may replace bolt 26 when container 16 is removed from cover 12 and is not desired to be used.

In FIGURES 3 and 4, a modified form of container 32 is shown to include a bottom wall 34 of circular configuration having a bell-shaped opening 36 which receives a threaded bolt 38 which is threadedly received by a knob (not shown) and a cover (not shown). Opening 36 extends into an integral sleeve 40 which provides maximum support for container 32 and sleeve 40 is freely received within opening 42 of sponge 44. Bolt 38 is provided with a circular head 46 which abuts with and encroaches upon the bell-shaped lower end of opening 36. Container 32 is provided with a plurality of spaced apart openings 48 which provide a means for exiting water vapor due to the evaporation of water from sponge 44 in the same manner as that heretofore described in the main embodiment of the present invention.

While various changes may be made in the detail construction, it shall be understood that such changes shall be within the spirit and scope of the present invention as defined by the appended claims.

What I claim as new and desire to protect by Letters Patent of the United States is:

1. A cake and pastry humidifier comprising in combination a transparent hollow cover, a flat circular container carried within said cover providing support and confinement means for a circular sponge carried within said cover, a threaded bolt carried within said cover providing a means for suspending said sponge container by means of a square knob carried by said cover, the head of said bolt retaining said cover and container being secured to the inside bottom surface of said container and being received through a central opening of said sponge which is flat in configuration, the upper end of said bolt extending through a central opening in said cover, said bolt having a threaded end at its upper extremity for threadingly receiving said knob, said knob providing handle grip means for lifting said cover, said container comprising a flat circular bottom wall bounded by an upstanding peripheral wall, said sponge of circular configuration resting on the bottom of said container which is open at its upper extremity for receiving water, the upper portion of said container's peripheral wall having a plurality of openings therethrough to provide a means for exiting water vapor caused by evaporation of water from within said sponge which is saturated before securement within said cover, and said openings in said peripheral wall all being at a higher elevation than the upper edge of said circular sponge.

2. The combination according to claim 1, wherein said knob when threadingly receiving the upper end of said threaded bolt draws said container upward by means of said threads, and the rim of said container receiving said sponge encroaches upon the arcuate inner radius of said cover to secure said cover securely in position above the cake or pastry which said cover is intended to protect and thus said cut or uncut pastry receives moisture emitted from said openings of said container from said sponge contained within said container and remains fresh for a long period of time.

References Cited by the Examiner

UNITED STATES PATENTS

| | | | |
|---|---|---|---|
| 1,534,342 | 4/1925 | Weihmann | 239—57 |
| 1,573,479 | 2/1926 | Christie | 312—31.1 |
| 1,655,248 | 1/1928 | Sharp | 239—57 |
| 2,955,889 | 10/1960 | Brokamp | 312—31.1 |

FOREIGN PATENTS

| | | |
|---|---|---|
| 571,058 | 1/1924 | France. |
| 532,133 | 8/1931 | Germany. |
| 251,935 | 8/1926 | Great Britain. |

M. HENSON WOOD, Jr., *Primary Examiner.*

EVERETT W. KIRBY, *Examiner.*

R. S. STROBEL, *Assistant Examiner.*